US012724648B1

(12) United States Patent
Goel et al.

(10) Patent No.: US 12,724,648 B1
(45) Date of Patent: Sep. 1, 2026

(54) CONTAINER SERVICE AUTO SCALING AND SUSPENSION TECHNIQUES

(71) Applicant: Snowflake Inc., Bozeman, MT (US)

(72) Inventors: Snigdha Goel, Bothell, WA (US); Yichao Hou, Bellevue, WA (US); Deepak Verma, Bothell, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/276,858

(22) Filed: Jul. 22, 2025

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/45591* (2013.01); *G06F 2209/501* (2013.01); *G06F 2209/508* (2013.01)

(58) Field of Classification Search
CPC ............... G06F 9/5077; G06F 9/45558; G06F 2009/45591; G06F 2209/501; G06F 2209/508
See application file for complete search history.

(56) References Cited

PUBLICATIONS

Keda, "Kubernetes Event-driven Autoscaling", [Online]. Retrieved from the Internet: https: keda.sh , (Accessed online Jul. 30, 2025), 20 pages.

*Primary Examiner* — Gregory A Kessler
(74) *Attorney, Agent, or Firm* — Schwegman Lundberg & Woessner, P.A.

(57) ABSTRACT

A cluster is provided to execute at least one containerized service in a cloud data platform. One or more monitor agents deployed on a plurality of worker nodes in the cluster collect a set of metrics associated with the at least one containerized service. A controller in the cluster aggregates the set of metrics according to at least one aggregation type defined in one or more autoscaling policies associated with the at least one containerized service and evaluates the aggregated set of metrics against criteria based on the one or more autoscaling policies to generate one or more autoscaling decisions.

17 Claims, 6 Drawing Sheets

CONTAINER SERVICE AUTO SCALING AND SUSPENSION TECHNIQUES

TECHNICAL FIELD

Embodiments of the disclosure relate generally to cloud data platforms and, more specifically, to autoscaling techniques for container services.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

As organizations increasingly adopt microservices and cloud-native architectures, containerized applications have become a popular approach for deploying and managing software workloads. Containers encapsulate applications and their dependencies into portable units, enabling consistent execution across diverse computing environments. However, the use of containerized workloads in cloud data platforms presents significant challenges for resource management.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

This disclosure pertains to maintaining and executing containerized applications (or services) in a cloud data platform. Containerized applications are software programs that are packaged together with their dependencies, libraries, and configuration files into a single, portable unit known as a container. In a cloud data platform, containerized services utilize compute pools, which are groupings of virtual machine nodes called a cluster.

This disclosure is directed to a framework for auto-scaling and auto-suspension of containerized services within a cloud data platform. The framework collects different types of metrics from the worker nodes in a cluster. The metrics are aggregated and evaluated against autoscaling policies within the cluster to generate scaling decisions. Scaling decisions are aggregated by a compute service manager outside the cluster to generate final scaling actions.

The technical benefits of this framework include enhanced flexibility and control over resource management for containerized workloads. By supporting a wide range of metrics, such as CPU, memory, GPU, ingress, and custom application metrics, the system can optimize scaling and suspension actions to better match specific workload patterns.

Figure 1:
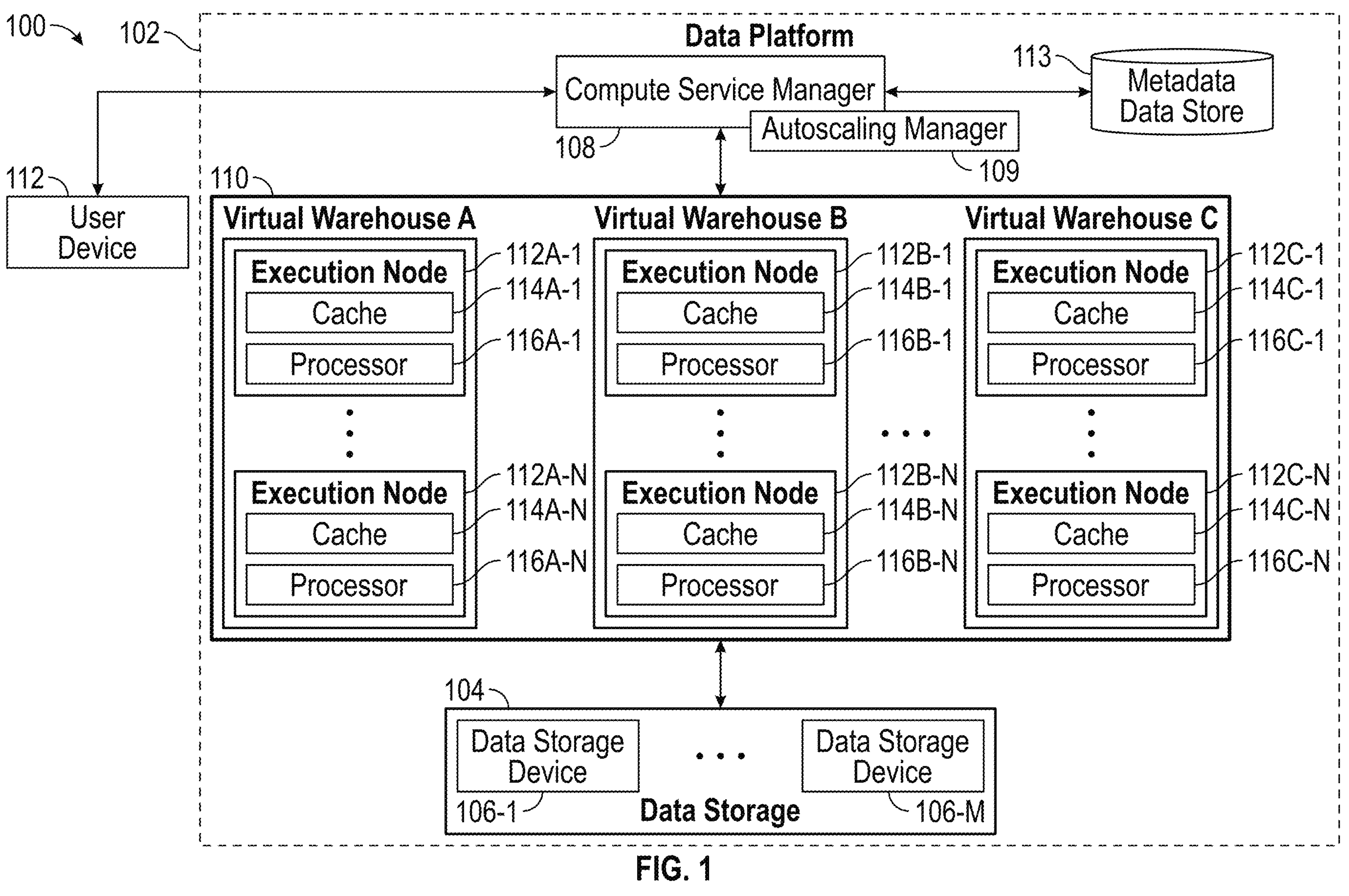
FIG. 1 illustrates an example computing environment that includes a cloud data platform, in accordance with some embodiments of the present disclosure.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

As shown, the compute service manager 108 includes an autoscaling manager 109 that is responsible for orchestrating autoscaling and suspension actions for clusters executing containerized applications. Further details of the operation of the autoscaling manager 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
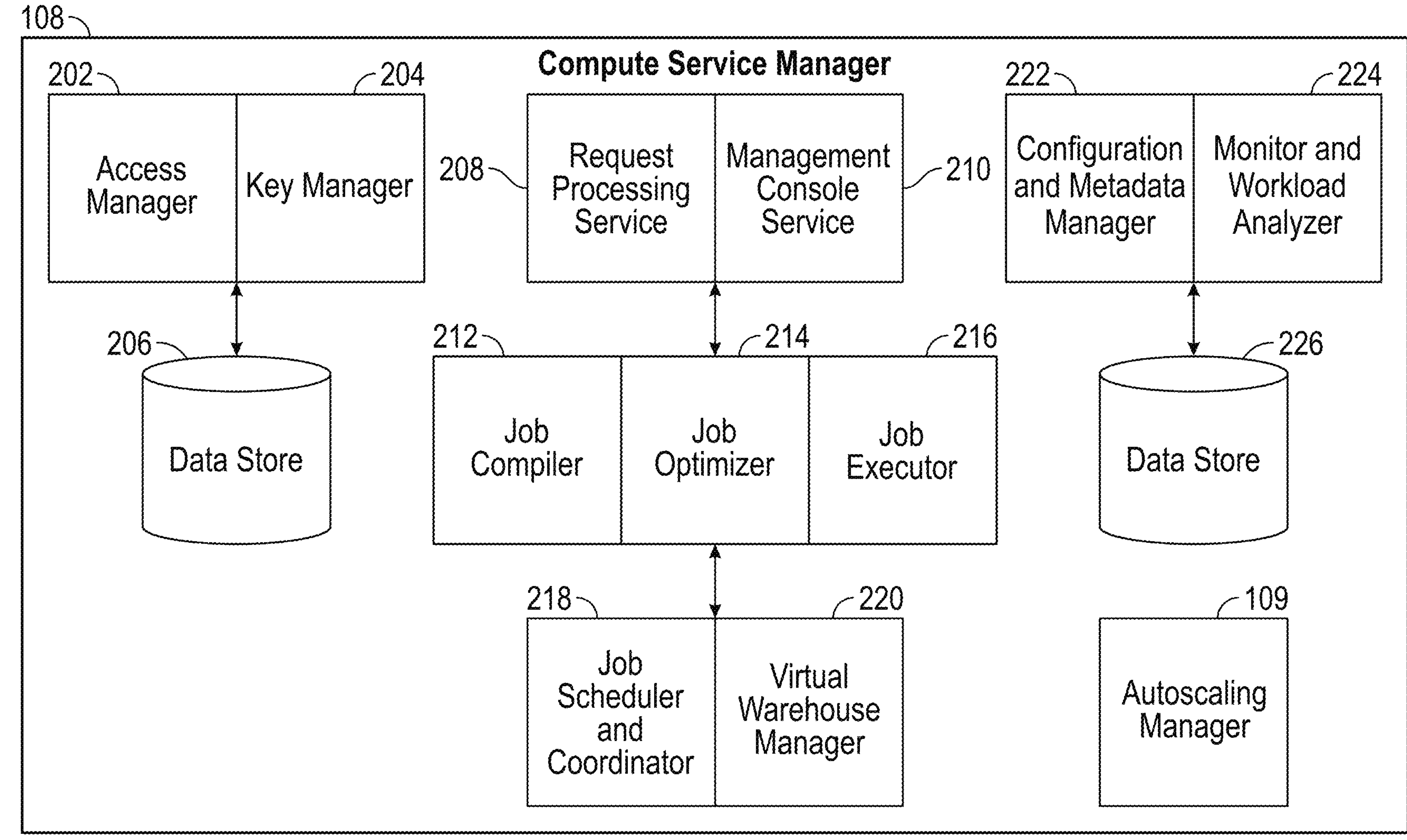
FIG. 2 is a block diagram illustrating components of a compute service manager of the cloud data platform, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

In addition, as mentioned above, the compute service manager 108 includes an autoscaling manager 109 that is responsible for orchestrating autoscaling and suspension actions for clusters executing containerized applications. Further details regarding the functionality of the autoscaling manager 109 are discussed below.

As shown, the compute service manager 108 includes an autoscaling manager 109 that is responsible for orchestrating autoscaling and suspension actions for clusters executing containerized applications. Further details of the operation of the autoscaling manager 109 are discussed below.

Containerized applications (or containerized services) are software applications that are packaged together with their dependencies, libraries, and configuration files into a single, self-contained unit called a "container." This container can run consistently across different computing environments, such as development, testing, and production, regardless of the underlying infrastructure. A container can provide an isolated environment for the application, such that the application can be executed without conflicts with other applications or the host system.

Containerized applications can be used in the cloud data platform 102, as described above. For example, a container services platform can be used for deploying, running, and scaling containerized applications directly within the cloud data platform 102. Containerized applications can allow users to deploy and run custom code (such as web services, data processing jobs, or machine learning models) inside the cloud data platform 102, providing portability, scalability, and ease of management.

The containerized services can leverage compute pools, which are collections of virtual machine nodes, to provide the computational resources for running these containerized workloads. This architecture allows the containerized applications to benefit from the governance and scalability features of the cloud data platform 102 while maintaining operational simplicity for end users.

The containerized services can be long-running or job-based, supporting a wide range of use cases from persistent APIs to batch data processing. Each service is defined by a specification that details the containers to run, the resources utilized, and the endpoints to expose.

However, the dynamic and multi-tenant nature of workloads running on container services can complicate intelligent resource management. As demand fluctuates, automatically adjusting the number of running service instances can lead to performance and cost efficiency. Traditional approaches, such as Kubernetes' Horizontal Pod Autoscaler (HPA), can offer basic scaling but lack support for more advanced and complex scenarios.

Therefore, a robust observability framework, as described herein, can be provided, enabling users to monitor platform metrics (such as CPU, memory, and GPU usage) as well as custom application metrics. These metrics are collected and made available for analysis, troubleshooting, and optimization, ensuring that users have deep visibility into the behavior and performance of their deployed services.

Advanced auto-scaling and auto-suspension techniques, as described herein, can leverage both platform and custom metrics. These techniques allow users to define precise scaling and suspension behaviors tailored to their unique workloads, ensuring optimal resource utilization and seamless user experiences. The ability to scale services up or down—or even suspend them entirely—based on real-time metrics and user-defined policies provide a variety of technical and performance benefits. The auto-scaling and auto-suspension techniques not only reduce operational overhead but also enable new patterns of workload management, such as event-driven scaling, coordinated scaling across multiple services, and fine-grained control over resource consumption.

Figure 3:
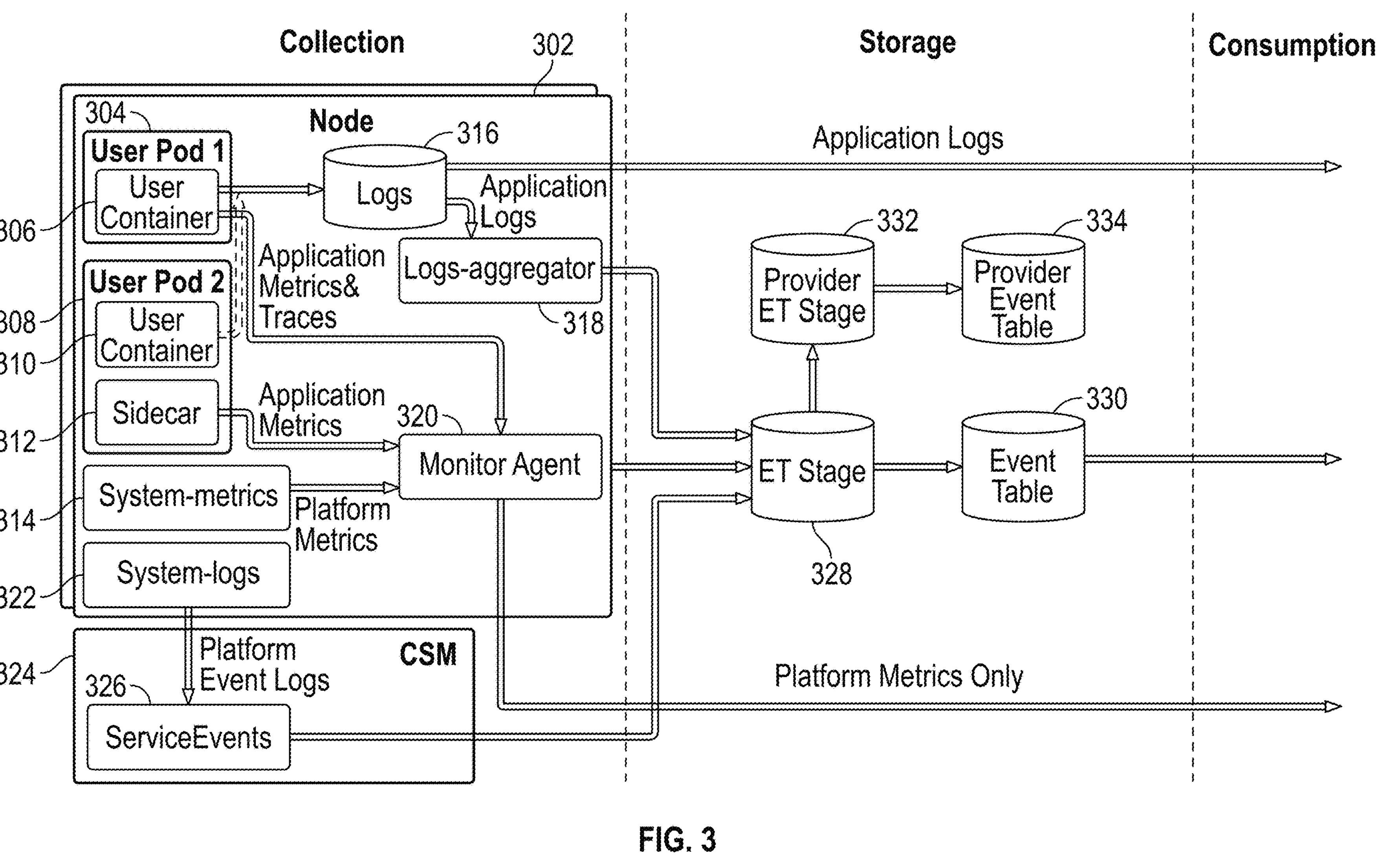
FIG. 3 shows an observability stack framework for monitoring performance metrics of containerized services, in accordance with some embodiments of the present disclosure.

FIG. 3 shows an observability stack framework for monitoring performance metrics of containerized services, in accordance with some embodiments of the present disclosure. The observability stack framework includes three stages: collection stage, storage stage, and consumption stage. In the collection stage, a plurality of nodes (represented by node 302) are provided. Node 302 may include a plurality of pods, such as user pod 304 and user pod 308. A pod encapsulates one or more containers that share the same network namespace, storage volumes, and lifecycle. For example, user pod 304 may include user container 306 (i.e., containerized application or service), and user pod 308 may include user container 310 (i.e., containerized application or service).

A pod is a deployable unit that can be created, scheduled, and managed. A pod is a logical host for one or more containers, providing the one or more containers with shared resources and a unified management lifecycle. Pods can be deployed to manage containerized workloads efficiently, so that related containers can operate together seamlessly within the same environment.

Containers within a pod can run on the same host and can communicate with each other using localhost networking. Containers in a pod can share storage volumes, which allows the containers to access the same files, and share the same IP address and port space. The containers in a pod may be managed as a single entity. If a pod is stopped or deleted, all containers within it may also be stopped or deleted together. While containers within a pod share certain resources, each pod is isolated from other pods, providing a boundary for security and resource management.

In this example, user pod 308 may also include a sidecar 312. Sidecar 312 can be a helper application that runs alongside the user container 310 to extend or enhance functionality of the user container 310. The sidecar 312 acts as a separate process that provides additional services, such as remote storage, metric transformation, or integration with other monitoring systems.

A file storage 316 represents storage for collecting application logs from user container 306 and user container 310 to user container 306 and user container 310 to collect application logs. A logs aggregator 318 can aggregate the collected logs. The application logs can also be sent directly to the consumption stage. For example, users may access the application logs via a system function.

A system metrics component 314 may observe platform metrics. A monitor agent 320 may be provided in the node 302 to collect application and platform metrics. The monitor agent 320, as described in further detail below, may collect identified metrics from user container 306 and user container 310 (by way of the sidecar 312). Metrics may include memory usage, GPU memory usage, GPU utilization, CPU count, GPU count, ingress points, etc., and custom metrics. In some examples, platform metrics may be sent directly to the consumption stage. For example, an endpoint exposed on the node 302 may be queried. System logs 322 may also be collected in the node 302.

A service events component 326 may be provided in a compute service manager 324, as described above. The compute service manager 324 may have deployed the node 302. The service events component 326 may include platform event logs.

In the storage stage, an event table stage 328 may collect aggregated logs from the log aggregator 318, application metrics from the monitor agent 320, and platform event logs from the service events component 326. Based on the collected information, an event table 330 is generated. In some examples, the collected information may be copied to a provider event table stage 332 to generate a provider event table 334. The event table 330 may be available to be queried by the consumption stage. For example, different applications can query the event table 330 for different purposes, such as analysis, troubleshooting, etc. The collected information may be used for autoscaling as described in further detail below.

Figure 4:
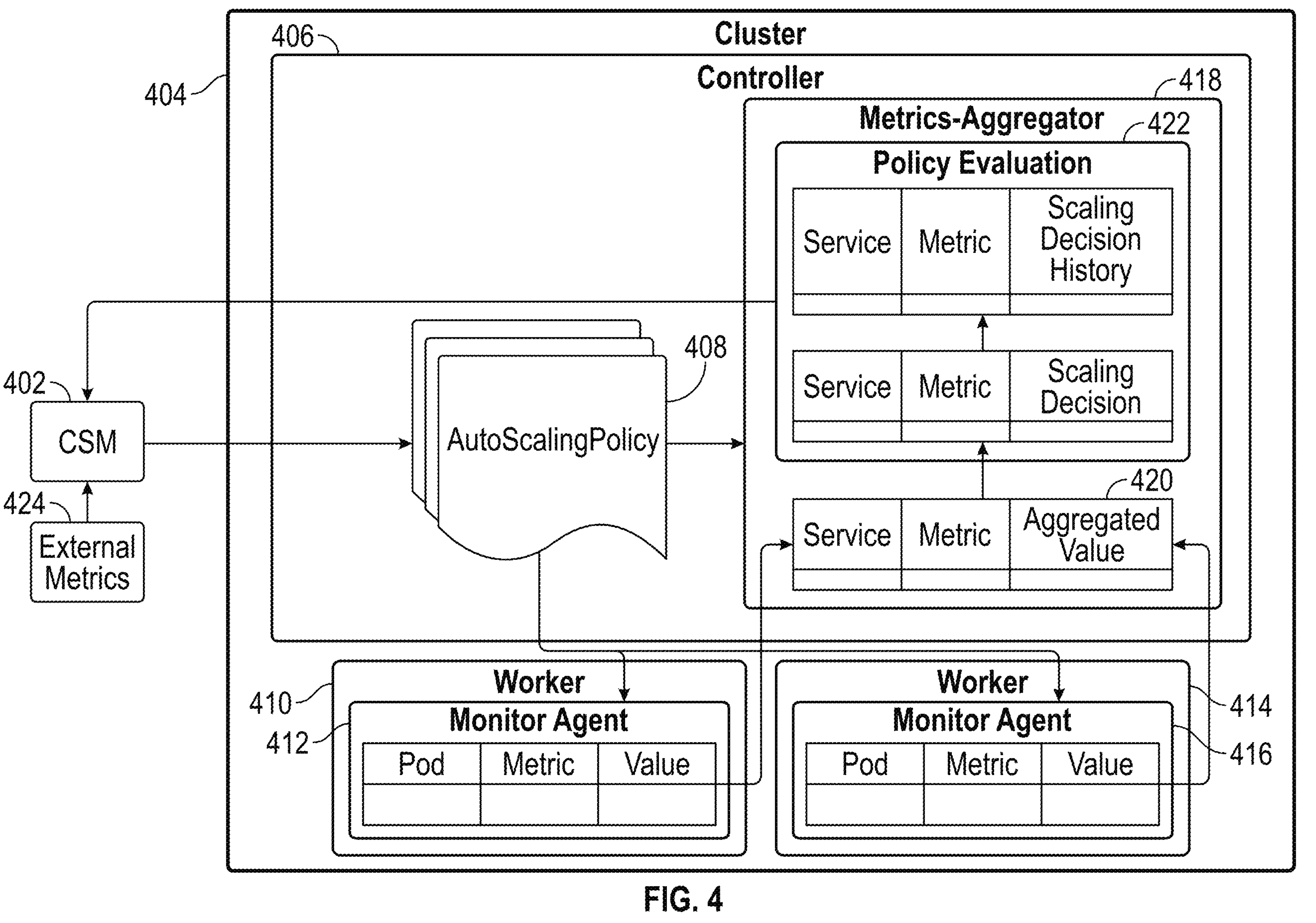
FIG. 4 shows an autoscaling framework using autoscaling policies for containerized services, in accordance with some embodiments of the present disclosure.

FIG. 4 shows an autoscaling framework using autoscaling policies for containerized services, in accordance with some embodiments of the present disclosure. A compute service manager 402 may be communicatively coupled to a cluster 404 (e.g., Kubernetes cluster) for performing containerized services. The cluster 404 may include a controller 406 and a plurality of workers, such as worker node 410 and worker node 414. The compute service manager 402 may maintain and store autoscaling policies (represented by autoscaling policy 408) in the controller 406. For example, the compute service manager 402 may create a configuration map, which contains autoscaling policy 408 defined in the service specification and pushes the configuration map as part of the resource set.

Autoscaling policy 408 may include a plurality of fields. A name field may include a unique name for the policy. An action field may include a selection of a scaling action type, such as scale down, scale up or suspend. Only one action can be selected per policy. For example, if a user wants to scale up and down based on the same metric (e.g., CPU usage), two separate policies are configured-one policy for scaling up based on the metric and another policy for scaling down based on the same metric.

Autoscaling policy 408 may include a metric policy, which defines scaling based on measured metrics. A metric name may define the platform or custom metric to which scaling for the particular policy is related. The metrics may include container level metrics, such as CPU usage and GPU utilization. The metrics may include network related metrics that are at the pod level.

A source field may specify the source for the collection of the metrics. The current service may be designated as the source; however, in some examples, another service may provide the metrics. For example, the ability to use a different source may allow users to scale/suspend backend services based on metrics collected from frontend services.

A container name field corresponds to the container that reports the metric. If a container is not specified, the system may assume it is a pod level metric. In some examples, labels associated with the metric are provided in key value pairs.

An aggregation type field may designate which type of aggregation to use for the metric. Aggregation types, for example, may include average, minimum, and maximum. The aggregation type corresponds to how the current metric value is to be calculated for the scaling action decision.

A cooldown period field may be included. The cooldown period corresponds to the wait time between consecutive scaling events to avoid flapping of service scaling. A default cooldown period may be used (e.g., 5 minutes). Also, a minimum cooldown period may be specified (e.g., 1 minute).

A stabilization period may be included. The stabilization period corresponds to a time interval a scaling decision holds true before triggering a scale/suspend activity to allow stabilization of the system from the previous scaling decision. If a scaling decision is made during the stabilization period, the stabilization period may be reset. A default stabilization period may be used (e.g., 5 minutes). Also, a minimum stabilization period may be specified for suspend actions. In some examples, a zero-stabilization period may be allowed for scale up and scale down actions, which may essentially disable the stabilization period.

As described in further detail below, the scaling may be performed using different techniques, such as target scaling and step scaling. Target scaling entails scaling based on a target metric value. For target scaling, a target value field may be included. For example, if the metric is CPU utilization, the target value can be a value between 0 and 1. If the metric is CPU usage, the target value can be the number of cores.

Step scaling entails scaling based on defined steps, which may be set by the user. Details of step scaling are described below. For step scaling, a scaling step field may be included, which may specify how the system adjusts the target instance count. An adjustment type field may also be included, which specifies which parameter to adjust, such as change instance count, percentage change of instance count, or exact instance count.

Within the cluster 404, multiple worker nodes 410, 414 are shown. Each worker node 410, 414 includes monitor agents 412, 416, respectively. The monitor agents 412, 416 are configured for collecting metrics based on the autoscaling policies 408. The metrics may be pod-level or container-level metrics, such as CPU, memory, GPU utilization, and custom application metrics. The monitor agents 412, 416 may monitor for configuration map changes relevant to pods running on the worker nodes 410, 414, respectively. The monitor agents 412, 416 may filter metrics by names and labels according to the autoscaling policies 408. Labels, for example, may be used by custom metrics.

The collected metrics by the monitor agents 412, 416 are then made available to the controller 406, which includes a metrics aggregator 418. For example, the metrics aggregator 418 may poll the worker nodes 410, 414 for metrics periodically and collect metrics reported by different pods.

The metrics aggregator 418 is configured to receive the raw metrics from the worker nodes 410, 414 and perform aggregation according to the configured autoscaling policies 408 to generate an aggregated result 420. As described above, the autoscaling policies 408 specify the metrics to monitor, the aggregation type (e.g., average, minimum, maximum), and the scaling or suspension actions to take when certain thresholds are met.

The metrics aggregator 418 includes a policy evaluation component 422. In some examples, the policy evaluation component 422 may be provided as an independent component outside of the metrics aggregator 414. The policy evaluation component 422 is configured to evaluate the current metric values (e.g., aggregation result 420) against the policy criteria and generates a policy evaluation result, which includes scaling decisions. In some examples, a history of service metrics may also be saved. For example, the policy evaluation component 422 performs policy evaluation for each metric based on the autoscaling policy 408 (e.g., target value) and generates a scaling decision. The scaling decision may include whether to scale up, scale down or suspend and target instance count based on the autoscaling policy 408.

The policy evaluation component 422 is configured to aggregate the scaling decisions based on the stabilization window for each policy. In some examples, the scaling decisions are stored in the configuration map of the service so that the system can recover the state during cluster upgrade to avoid resetting the stabilization window.

The metrics aggregator 418 may transmit the scaling decisions to the compute service manager 402 (e.g., to autoscaling manager 109 as described above), which acts as the global service responsible for orchestrating scaling actions across the cluster. In some examples, the transmission of the scaling decisions may be triggered by a scaling decision change. For example, the metrics aggregator 418 may push the decisions to the compute service manager 402 through a configuration map update when the scaling decision changes. The compute service manager 402 may include an observer component to listen for scaling decision updates. The compute service manager 402 may also receive external metrics 424, enabling support for scaling based on metrics reported by other services or external sources.

The compute service manager 402 may monitor for new scaling decisions for each policy and stores the decisions in memory. If there are multiple policies defined for a single service, the compute service manager 402 performs the aggregation and generates a final scaling decision for the service. The observer component may refresh the decisions periodically (e.g., every 3 minutes) to ensure the decisions are up to date. On observer restart, the observer component reloads the scaling decisions for the policies.

The compute service manager 402 is configured to enforce a cool down period after applying the policy because it takes time for the cluster to be adjusted to a new desired instance account for the metrics aggregator 418 to collect the latest data from the worker nodes 410, 414. The compute service manager 402 may enforce a cool-down during worker upgrades to account for pod movements and changing instance counts. Further details of the compute service manager 402 performing autoscaling are described below.

Figure 5:
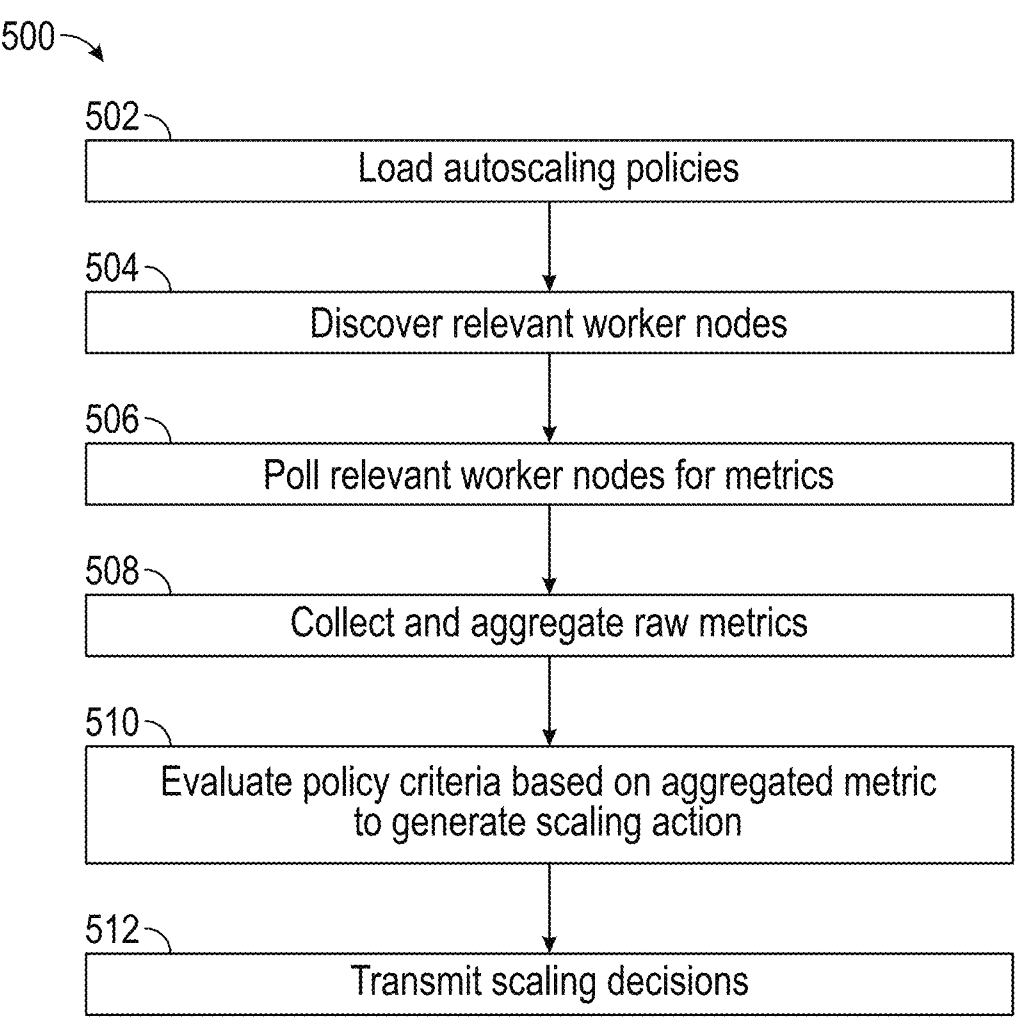
FIG. 5 is a flow diagram of a method for aggregating metrics and performing scaling decisions, in accordance with some embodiments of the present disclosure.

FIG. 5 is a flow diagram of a method 500 for aggregating metrics and performing scaling decisions, in accordance with some embodiments of the present disclosure. In some examples, the method 500 may be performed by the controller 406 (e.g., metrics aggregator 418) as described above with reference to FIG. 4.

At operation 502, autoscaling policies for a service are loaded. For example, the controller 406 may retrieve autoscaling policies from the configuration map of the service.

At operation 504, relevant worker nodes are discovered. For example, the controller 406 may identify worker nodes running service pods relevant to the loaded autoscaling policies.

At operation 506, the relevant worker nodes are polled for metrics. For example, the controller 406 may transmit a request to monitor agents in the identified worker nodes for the metrics relevant to the autoscaling policies.

At operation 508, raw metrics are collected and aggregated. For example, the controller 406 may collect pod-level and container-level metrics from the identified worker nodes. The metrics are filtered and organized by policies. For each policy, the controller 406 may apply the specified aggregation type (e.g., average, minimum, maximum) to the metrics to generate an aggregated result.

At operation 510, policy criteria are evaluated based on the aggregated metric result to generate a scaling decision. For each policy, the controller 406 may determine whether a scaling action (e.g., scale up, scale down, suspend) is triggered. Scaling decisions may be aggregated based on the stabilization window for each policy. The scaling decisions and scaling history may be stored in the configuration map for recovery and stabilization tracking.

At operation 512, the scaling decisions are transmitted to the compute service manager. For example, the controller 406 may transmit the scaling decisions to the compute service manager when triggered by a scaling decision change or at a scheduled time (e.g., every 3 minutes).

Figure 6:
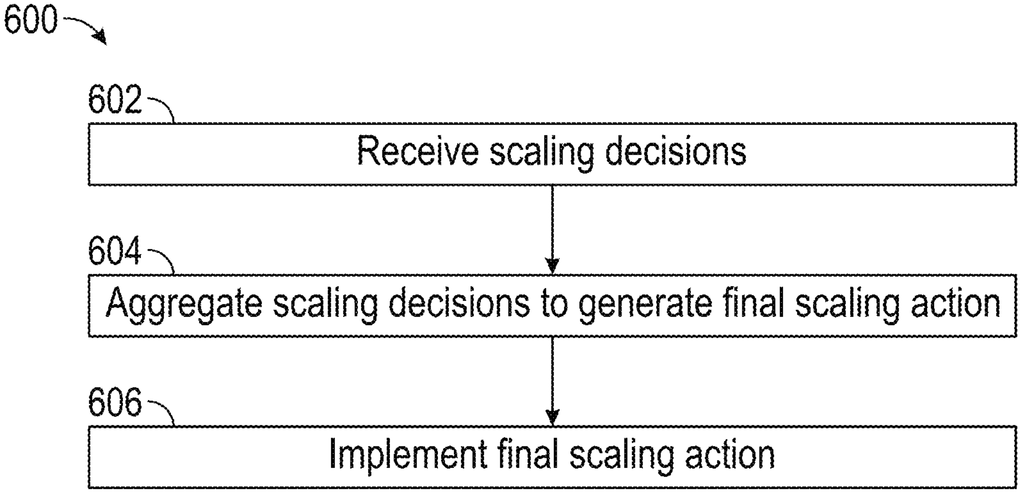
FIG. 6 is a flow diagram of a method for an autoscaling decision process, in accordance with some embodiments of the present disclosure.

FIG. 6 is a flow diagram of a method 600 for an autoscaling decision process, in accordance with some embodiments of the present disclosure. In some examples, the method 600 may be performed by the compute service manager 402 (e.g., autoscaling manager 109) as described above.

At operation 602, scaling decision updates are received. For example, an observer component may monitor for scaling decision changes from the controller for a cluster via configuration map update. For a service, the compute service manager 402 may receive the latest scaling decisions.

At operation 604, the scaling decisions for a service are aggregated to generate final scaling action. For example, if multiple policies are defined for a service, the compute service manager 402 may apply aggregation logic. The aggregation logic may define prioritization of different scaling actions. In some examples, scaling up may be given the highest priority. For example, if any scale up policy is true, then the compute service manager 402 may prioritize and implement a scaling up action. That is, even if one scale up policy is true and all scale down policies are also true, the system still prioritizes scaling up and will implement a scaling up action.

In some examples, a scaling down/suspension action is only triggered if all scaling down/suspension policies are true. Consider an example where the current instance count is 10. If a first scaling down policy recommends scaling down to 8 and a second scaling down policy recommends scaling down to 5, the compute service manager 402 may scale down to 8 based on the first scaling down policy to be conservative. In contrast, scaling up policies may be more aggressive. In the same scenario of 10 current instance count, if a first scaling up policy recommends scaling up to 15 and a second scaling up policy recommends scaling up to 12, the compute service manager 402 may scale up to 15 based on the more aggressive first scaling up policy.

In some examples, suspension may be performed only if the instance count is at a minimum; otherwise, a suspension action may be converted to a scale down action. For example, if a service has a minimum count of 5, the current instance count is 8, and the aggregated scaling decision is to suspend, the compute service manager 402 may convert the suspend action to a scale down action until the count reaches t the minimum count of 5.

Scaling up and down may be performed using target scaling or step scaling. Target scaling entails scaling based on a target metric value. Step scaling entails scaling based on defined steps. Step scaling allows users to define how a service should adjust its instance count in response to specific metric thresholds.

Unlike target-based scaling, which attempts to maintain a metric at a particular target value by incrementally adjusting the number of instances, step scaling enables more granular control over scaling actions. With step scaling, users can specify discrete steps or ranges for a metric, and associate each range with a particular scaling adjustment. This approach is particularly useful for workloads that exhibit sudden changes in demand or require more aggressive or conservative scaling behaviors at different utilization levels.

Each scaling step defines a lower and upper bound for the metric, and an adjustment to be made when the current metric value falls within that range. For example, the adjustment can be specified in three ways: as a fixed change in the number of instances, as a percentage change relative to the current instance count, or as an exact target instance count.

For example, a step scaling policy might specify that if CPU utilization is between 60% and 80%, the system should add one instance, and if it is between 80% and 100%, it should add two instances. Alternatively, a policy may state that if utilization is within a certain range, the instance count should be set to a specific value, regardless of the current count. This flexibility allows users to tailor scaling behavior to the unique performance and cost requirements of their applications. Step scaling can be bounded by the minimum and maximum instance limits defined for the service, so that scaling actions do not exceed configured resource constraints.

In some examples, cooldown and stabilization periods may also be enforced before a scaling action is implemented. For example, the compute service manager 402 may check if the cooldown period has elapsed since the last scaling action. If the cooldown period has not elapsed, the compute service manager 402 may defer further scaling actions until the cooldown period expires.

At operation 606, the final scaling action is implemented on the cluster. For example, the compute service manager 402 may update the desired instance count of the service for scaling up and down actions or suspend the service for suspend action in the cluster. The final scaling action may be recorded and timestamped for stabilization and cooldown tracking. The final scaling action and new state may be stored in memory or persistent storage, which may allow for auditing.

In view of the disclosure above, various examples are set forth below. It should be noted that one or more features of an example, taken in isolation or combination, should be considered within the disclosure of this application.

Example 1. A method comprising: providing a cluster to execute at least one containerized service in a cloud data platform; collecting, by one or more monitor agents deployed on a plurality of worker nodes in the cluster, a set of metrics associated with the at least one containerized service; aggregating, by a controller in the cluster, the set of metrics according to at least one aggregation type defined in one or more autoscaling policies associated with the at least one containerized service; evaluating, by the controller, the aggregated set of metrics against criteria based on the one or more autoscaling policies to generate one or more autoscaling decisions; transmitting, by the controller, the one or more autoscaling decisions to a compute service manager in the cloud data platform outside the cluster; aggregating, by the compute service manager, the one or more autoscaling decisions to generate a final scaling action; and implementing, by the compute service manager, the final scaling action on the cluster.

Example 2. The method of example 1, wherein the set of metrics comprise application metrics and platform metrics.

Example 3. The method of any of examples 1-2, further comprising: enforcing, by the compute service manager, a stabilization period prior to implementing the final scaling action.

Example 4. The method of any of examples 1-3, wherein the stabilization period comprises a time interval during which the criteria is to be satisfied continuously before the final scaling action is implemented.

Example 5. The method of any of examples 1-4, further comprising: enforcing, by the compute service manager, a cooldown period prior to implementing the final scaling action.

Example 6. The method of any of examples 1-5, wherein the cooldown period comprises a minimum time interval between consecutive scaling actions for the at least one containerized service.

Example 7. The method of any of examples 1-6, wherein a first autoscaling policy of the one or more autoscaling policies comprises a step scaling policy that defines a plurality of metric value ranges, each range associated with a corresponding scaling adjustment.

Example 8. The method of any of examples 1-7, further comprising: receiving, by the compute service manager, external metrics reported by another service or source, and evaluating the external metrics as part of generating the one or more autoscaling decisions.

Example 9. A system comprising: one or more processors of a machine; and a memory storing instructions that, when executed by the one or more processors, cause the machine to perform operations implementing any one of example methods 1 to 8.

Example 10. A machine-storage medium embodying instructions that, when executed by a machine, cause the machine to perform operations implementing any one of example methods 1 to 8.

Figure 7:
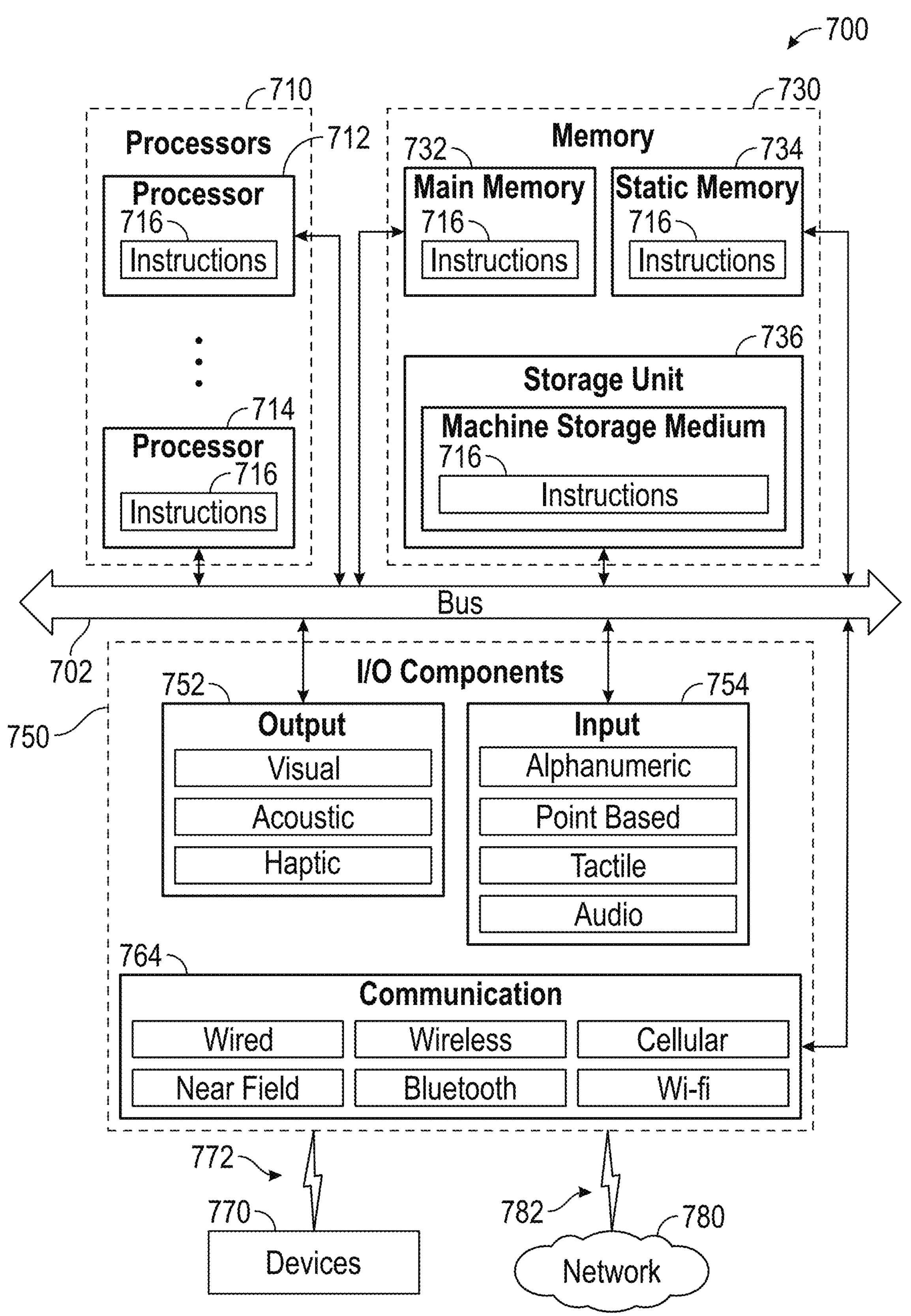
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., a software, a program, an application, an applet, an app, or other executable code) for causing the machine 700 to perform any one or more of the methodologies discussed herein may be executed. For example, the instructions 716 may cause the machine 700 to execute any one or more operations of the methods described herein. As another example, the instructions 716 may cause the machine 700 to implement any one or more portions of the functionality illustrated in any one of FIGS. 1, 2, 3, and 4. In this way, the instructions 716 transform a general, non-programmed machine into a particular machine that is specially configured to carry out any one of the described and illustrated functions of the cloud data platform 102 such as the compute service manager 108 (or a component thereof such as the autoscaling manager 109) or an execution node of the execution platform 110.

In some embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and I/O components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 714 and a processor 712 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108, the execution platform 110, and the devices 770 may include the data store 206 or any other computing device described herein as being in communication with the cloud data platform 102 or the data storage 104.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one hardware processor; and at least one memory storing instructions that cause the at least one hardware processor to perform operations comprising:

providing a cluster comprising a plurality of worker nodes to execute at least one containerized service in a cloud data platform, the at least one containerized service comprises a software application encapsulated with at least one dependency, library, and configuration file within a container executing on the plurality of worker nodes;

collecting, by one or more monitor agents deployed on the plurality of worker nodes in the cluster, a set of metrics associated with execution of the at least one containerized service by the plurality of worker nodes, the set of metrics being measured during runtime execution of the at least one containerized service, the set of metrics comprising at least one application metric and at least one platform metric;

aggregating, by the controller in the cluster, the set of metrics according to at least one aggregation type defined in one or more autoscaling policies associated with the at least one containerized service;

evaluating, by the controller, the aggregated set of metrics against criteria based on the one or more autoscaling policies to generate one or more autoscaling decisions, each autoscaling decision specifying a recommended scaling direction and magnitude;

transmitting, by the controller, the one or more autoscaling decisions to a compute service manager in the cloud data platform outside separate from and external to the cluster, the compute service manager being responsible for orchestrating scaling actions across the cluster;

aggregating, by the compute service manager, the one or more autoscaling decisions to generate a final scaling action; and implementing, by the compute service manager, the final scaling action on the cluster.

2. The system of claim 1, wherein the operations further comprise:

enforcing, by the compute service manager, a stabilization period prior to implementing the final scaling action.

3. The system of claim 2, wherein the stabilization period comprises a time interval during which the criteria is to be satisfied continuously before the final scaling action is implemented.

4. The system of claim 1, wherein the operations further comprise:

enforcing, by the compute service manager, a cooldown period prior to implementing the final scaling action.

5. The system of claim 4, wherein the cooldown period comprises a minimum time interval between consecutive scaling actions for the at least one containerized service.

6. The system of claim 1, wherein a first autoscaling policy of the one or more autoscaling policies comprises a step scaling policy that defines a plurality of metric value ranges, each range associated with a corresponding scaling adjustment.

7. The system of claim 1, wherein the operations further comprise:

receiving, by the compute service manager, external metrics reported by another service or source, and evaluating the external metrics as part of generating the one or more autoscaling decisions.

8. A method comprising:

providing a cluster comprising a plurality of worker nodes to execute at least one containerized service in a cloud data platform, the at least one containerized service comprises a software application encapsulated with at least one dependency, library, and configuration file within a container executing on the plurality of worker nodes;

collecting, by one or more monitor agents deployed on the plurality of worker nodes in the cluster, a set of metrics associated with execution of the at least one containerized service by the plurality of worker nodes, the set of metrics being measured during runtime execution of the at least one containerized service, the set of metrics comprising at least one application metric and at least one platform metric;

aggregating, by the controller in the cluster, the set of metrics according to at least one aggregation type defined in one or more autoscaling policies associated with the at least one containerized service;

evaluating, by the controller, the aggregated set of metrics against criteria based on the one or more autoscaling policies to generate one or more autoscaling decisions, each autoscaling decision specifying a recommended scaling direction and magnitude;

transmitting, by the controller, the one or more autoscaling decisions to a compute service manager in the cloud data platform separate from and external to the cluster, the compute service manager being responsible for orchestrating scaling actions across the cluster;

aggregating, by the compute service manager, the one or more autoscaling decisions to generate a final scaling action; and implementing, by the compute service manager, the final scaling action on the cluster.

9. The method of claim 8, further comprising:

enforcing, by the compute service manager, a stabilization period prior to implementing the final scaling action.

10. The method of claim 9, wherein the stabilization period comprises a time interval during which the criteria is to be satisfied continuously before the final scaling action is implemented.

11. The method of claim 8, further comprising:

enforcing, by the compute service manager, a cooldown period prior to implementing the final scaling action.

12. The method of claim 11, wherein the cooldown period comprises a minimum time interval between consecutive scaling actions for the at least one containerized service.

13. The method of claim 8, wherein a first autoscaling policy of the one or more autoscaling policies comprises a step scaling policy that defines a plurality of metric value ranges, each range associated with a corresponding scaling adjustment.

14. The method of claim 8, further comprising:

receiving, by the compute service manager, external metrics reported by another service or source, and evaluating the external metrics as part of generating the one or more autoscaling decisions.

15. A machine-storage medium embodying instructions that, when executed by a machine, cause the machine to perform operations comprising:

providing a cluster comprising a plurality of worker nodes to execute at least one containerized service in a cloud data platform, the at least one containerized service comprises a software application encapsulated with at least one dependency, library, and configuration file within a container executing on the plurality of worker nodes;

collecting, by one or more monitor agents deployed on the plurality of worker nodes in the cluster, a set of metrics associated with execution of the at least one containerized service by the plurality of worker nodes, the set of metrics being measured during runtime execution of the at least one containerized service, the set of metrics comprising at least one application metric and at least one platform metric;

aggregating, by the controller in the cluster, the set of metrics according to at least one aggregation type defined in one or more autoscaling policies associated with the at least one containerized service;

evaluating, by the controller, the aggregated set of metrics against criteria based on the one or more autoscaling policies to generate one or more autoscaling decisions, each autoscaling decision specifying a recommended scaling direction and magnitude;

transmitting, by the controller, the one or more autoscaling decisions to a compute service manager in the cloud data platform separate from and external to the cluster, the compute service manager being responsible for orchestrating scaling actions across the cluster;

aggregating, by the compute service manager, the one or more autoscaling decisions to generate a final scaling action; and implementing, by the compute service manager, the final scaling action on the cluster.

16. The machine-storage medium of claim 15, wherein the operations further comprise:

enforcing, by the compute service manager, a stabilization period prior to implementing the final scaling action.

17. The machine-storage medium of claim 16, wherein the stabilization period comprises a time interval during which the criteria is to be satisfied continuously before the final scaling action is implemented.

* * * * *